United States Patent
Komori et al.

Patent Number: 5,488,527
Date of Patent: Jan. 30, 1996

[54] MAGNETIC HEAD INCLUDING A MAGNETIC RECORDING MEDIUM SLIDE SURFACE WITH PREDETERMINED DIMENSIONS

[75] Inventors: Noboru Komori; Yoshiaki Kato; Masaru Umekida, all of Minami-ashigara, Japan

[73] Assignee: Fuji Photo Film Co., Ltd., Kanagawa, Japan

[21] Appl. No.: 191,729

[22] Filed: Feb. 4, 1994

Related U.S. Application Data

[63] Continuation of Ser. No. 728,499, Jul. 11, 1991, abandoned.

[30] Foreign Application Priority Data

Jul. 20, 1990 [JP] Japan ................................. 2-190629

[51] Int. Cl.$^6$ ................................. G11B 5/60; G11B 5/147
[52] U.S. Cl. ........................... 360/122; 360/103; 360/126
[58] Field of Search ........................... 360/103, 104, 360/122, 119, 125, 126

[56] References Cited

U.S. PATENT DOCUMENTS

| | | | |
|---|---|---|---|
| 4,195,322 | 3/1980 | Cox et al. | 360/103 |
| 4,330,804 | 5/1982 | DeMoss | 360/103 |
| 4,375,656 | 3/1983 | Radman, Jr. et al. | 360/102 |
| 4,420,780 | 12/1983 | Deckert | 360/103 |
| 4,809,104 | 2/1989 | Knudsen et al. | 360/103 |
| 4,974,106 | 11/1990 | White et al. | 360/103 |
| 5,047,884 | 9/1991 | Negishi et al. | 360/103 |
| 5,065,500 | 11/1991 | Yoneda et al. | 360/103 |

Primary Examiner—Stuart S. Levy
Assistant Examiner—Jefferson Evans
Attorney, Agent, or Firm—Sughrue, Mion, Zinn, Macpeak & Seas

[57] ABSTRACT

A magnetic head for stretch surface recording SSR includes a floating head slider having a facing surface formed as a part of a spherical surface, wherein a radius R of said spherical surface is given by 80 mm$\leq$R$\leq$100 mm., the facing surface as viewed from a magnetic recording medium is in the shape of a rectangle having an overall length L along the air flow of 3 mm or less and a transverse width W in a direction normal to the air flow of about 2 mm or less, and wherein at least two longitudinal grooves each having a width w given by 100 μm$\leq$w$\leq$500 μm are formed on the facing surface extending along the air flow. Floating stability at a high frequency range of 1 to 14 MH$_2$ is achieved.

10 Claims, 7 Drawing Sheets

(c)

R=31

R=33

R=35

(d)

R=31

R=33

(e)

(f)

(g)

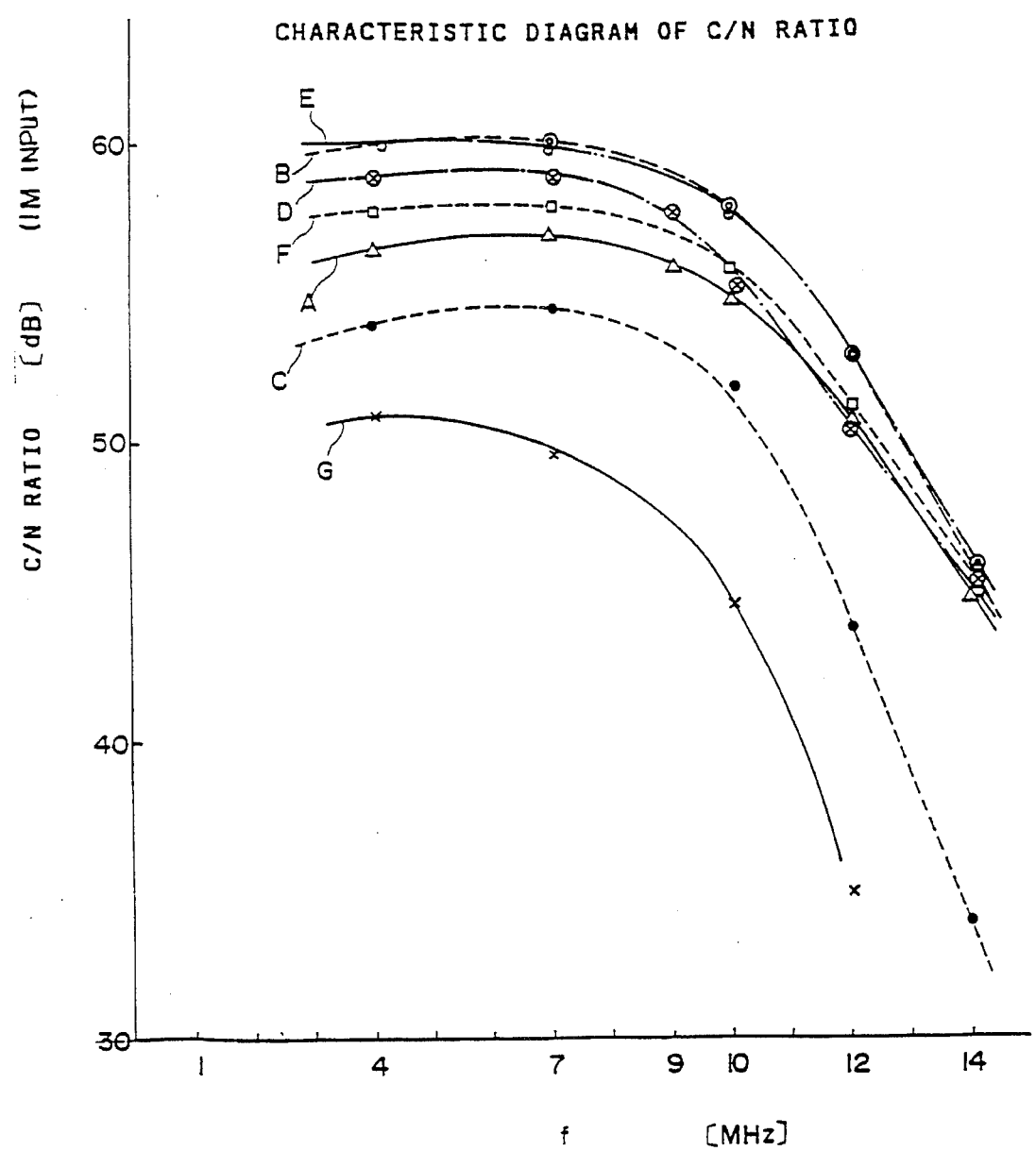

MAGNETIC HEAD INCLUDING A MAGNETIC RECORDING MEDIUM SLIDE SURFACE WITH PREDETERMINED DIMENSIONS

This is a continuation of application No. 07/728,499, filed Jul. 11, 1991, now abandoned.

FIELD OF THE INVENTION

This invention relates to a magnetic head. More particularly, it relates to a magnetic head for stretched surface recording (SSR) which is employed in a magnetic recording apparatus in which a stretched surface recording medium (SSR medium) is used as a magnetic recording medium.
Background The SSR medium or SSR disk has been proposed as a magnetic recording medium for a magnetic storage system for, for example, an electronic computer. The SSR disk includes a disk film including a magnetic layer, as a recording medium formed by coating, sputtering etc. on a substrate of a polyethylene terephthalate or polyimide film. The disk film is stretched under a predetermined tension on an annular frame and secured thereto, such as by adhesion or bonding. The disk is rotationally driven under a motive power driving the annular frame into rotation.

The magnetic head for SSR according to the present invention is of the type in which the magnetic head is floated over the SSR disk by means of an air flow induced by rotation of the SSR disk to have access to a magnetic recording medium on the SSR disk.

A conventional magnetic head for SSR is disclosed in U.S. Pat. No. 4,809,104, in which a floating head slider is disclosed which has an end surface facing the disk (referred to as "facing surface") formed as a part of a spherical surface having a radius R of 102 mm, with the facing surface being a rectangle in profile having a transverse width of 3.2 mm and an overall length of 4.3 mm. Four longitudinal grooves are disposed on the facing surface of the slider extending along the air flow.

DISCUSSION OF THE RELATED ART

Although it has been disclosed in the U.S. Patent that a predetermined small floating amount of 0.1 to 0.19 μm may be achieved with the floating head slider having the above described shape and size, there is no disclosure concerning floating stability and recording/reproducing performance of the magnetic head. However, in a magnetic head for a magnetic recording apparatus provided with a floating head slider, such as a hard disk device, the degree of float, floating stability and recording/reproducing performance in a higher frequency range, are becoming crucial factors, in order to cope with a requirement for an increasing recording density in the modern magnetic recording apparatus. Above all, floating stability plays a most crucial role particularly in a magnetic head for SSR disk in which, since the medium has a film structure, the amount of float tends to be changed by collision between the magnetic head and the disk and resulting vibrations.

SUMMARY OF THE DISCLOSURE

It is therefore an object of the present invention to improve the conventional magnetic head for SSR and to provide a magnetic head for SSR in which the amount of float is maintained to be as small as possible and which is superior not only in floating stability but in frequency characteristics.

For accomplishing the above object, the present invention provides a magnetic head comprising a floating head slider having a facing surface formed as a part of a spherical surface, wherein a radius R of said spherical surface is given by 80 mm≦R≦100 mm, said facing surface as viewed from a magnetic recording medium is in the shape of a rectangle having an overall length L along the air flow of 3 mm or less and a transverse width W in a direction normal to the air flow of 2.2 mm or less, and wherein at least two longitudinal grooves each having a width w given by 100 μm≦w≦500 μm are formed on said facing surface extending along said air flow.

With the magnetic head for SSR according to the present invention, since the facing surface of the floating head slider is formed as a part of a spherical surface having a radius R within a range of 80 mm≦R≦100 mm and has a rectangular profile with a transverse width of not more than 2.2 mm and an overall length of not more than 3 mm, as viewed from the SSR disk, and since at least two longitudinal grooves, each having a width w within a range of 100 μm≦w≦500 μm, are formed on the facing surface, the magnetic head exhibits a satisfactory modulation waveform, which is an index of floating stability over the SSR disk, and a satisfactory C/N ratio in the high frequency range required in magnetic recording. Thus the magnetic head for SSR is excellent in floating stability and frequency characteristics, while being capable of meeting the demand for a higher recording density of the recording signals and producing high-quality playback signals.

BRIEF DESCRIPTION OF THE DRAWINGS

FIG. 4 is a graph showing C/N ratio of characteristic curves of the samples A to G.

DESCRIPTION OF THE PREFERRED EMBODIMENTS

The groove width is preferably 200 to 300 μm. Preferably, the overall length L is at least 1 mm, and the transverse width W is preferably at least 1 mm and not more than 2 mm.

The present inventors have produced various test, samples as explained below and conducted performance tests necessary for achieving the object of the present invention, as a result of which the present invention has been achieved.
(1) Determination of the Radius of the Spherical Surface A number of magnetic heads having floating head sliders having the facing surfaces which are provided with the transverse widths W=2 mm, overall lengths L=3 mm and 4 mm and radius R of the spherical facing surfaces 30 mm, 60 mm, 80 mm and 100 mm and which are not provided with grooves, were produced as test samples, and tested on floating stability and playback performance within the prescribed frequency range. Evalution of the floating stability was made on the basis of uniformity of the modulation waveform in the reproduced signals while evaluation of the frequency characteristics was made on the basis of measured results of the C/N ratio in the frequency range of 1 to 14 MHz. The modulation waveform and the C/N ratio were measured by the methods shown in (2) below.

By the above two tests, it has been determined that, among the test samples of the magnetic heads, those having the radii R of the spherical facing surfaces of the sliders equal to 80 mm and 100 mm exhibit satisfactory floating stability and frequency characteristics, whereas those having the radii R equal to 30 mm and 60 mm exhibit poor floating stability as compared to those with R equal to 80 mm and 100 mm. Of the test samples with the radii R equal to 80 mm and 100 mm, the sample with the radius R equal to 80 mm exhibited particularly excellent characteristics.

(2) Selection of Shape and Grooves

The radius R equal to 80 mm, which exhibited superior characteristics in the test item (1) above has been adopted. The other dimensions of the test samples of the floating head sliders have been set as shown in Table 1 and the test samples of the magnetic heads for SSR A to G, provided with two central electro-magnetic transducer elements, have been produced for testing sake.

TABLE 1

| Samples | Size of facing surface of slider (groove width × length) (mm) | Width and number of grooves on facing surface of slider |
| --- | --- | --- |
| A | 2 × 4 | groove |
| B | 2 × 3 | groove |
| C | 2 × 4 | 230 µm × 4 grooves |
| D | 2 × 3 | 230 µm × 4 grooves |
| E | 2 × 3 | 700 µm × 2 grooves |
| F | 2 × 3 | 230 µm × 2 grooves |
| G | 3.2 × 4.3 | 150 µm × 4 grooves |

The test sample C has its two central grooves shorter in groove length than the remaining two grooves. The test samples A to G are shown in perspective in FIGS. 2 (a) to (g), respectively.

Figure 3A:
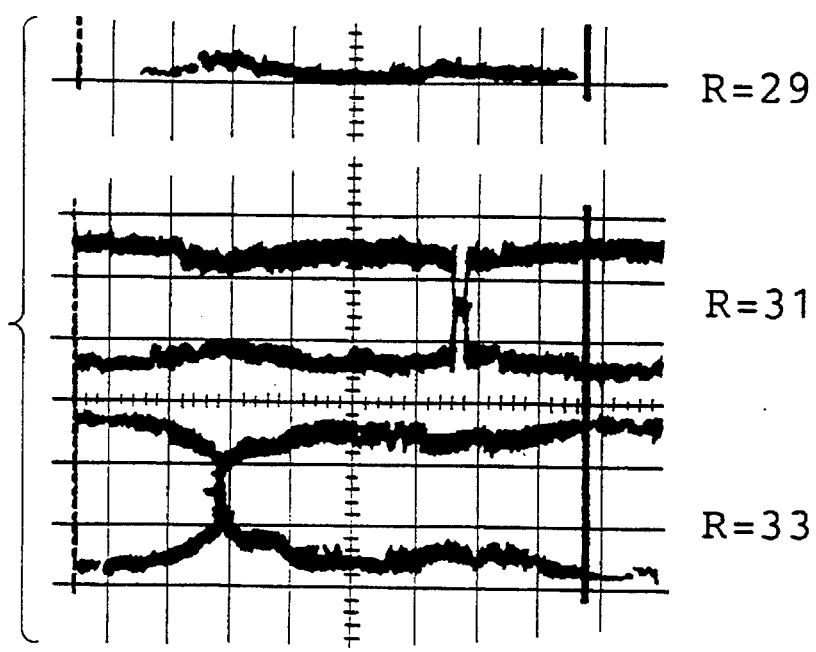
FIG. 3(a) to (g) are graphs showing modulation waveforms of the test samples A to G, respectively.
Figure 3B:
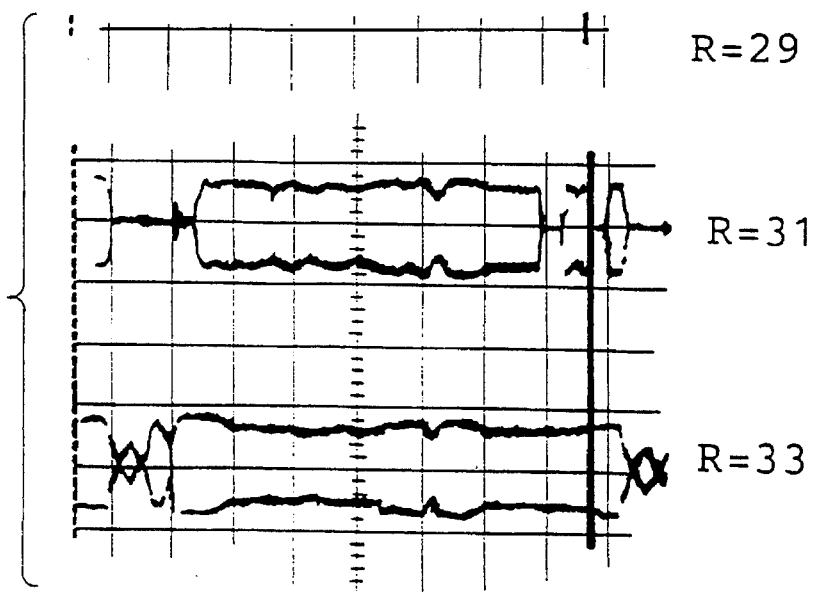
Figure 3:
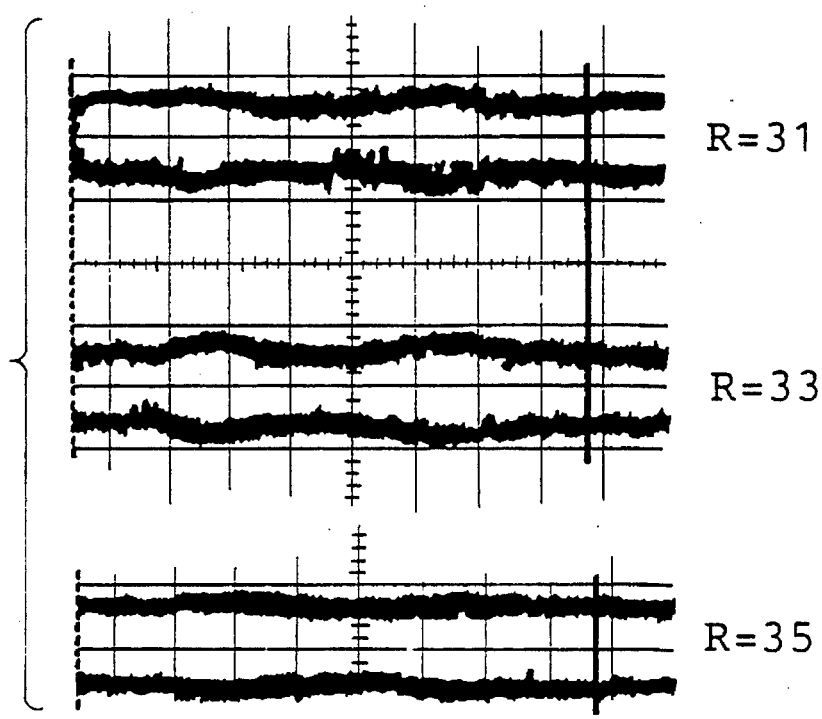
Figure 3:
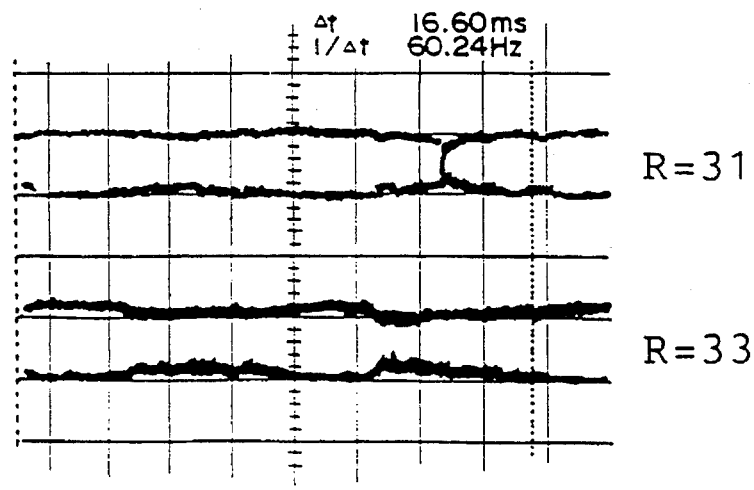
Figure 3:
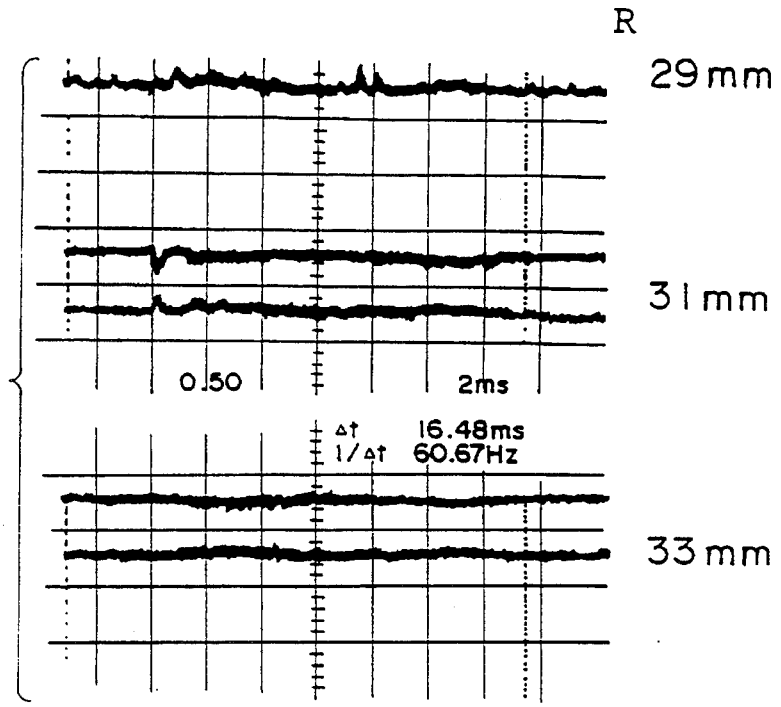
Figure 3:
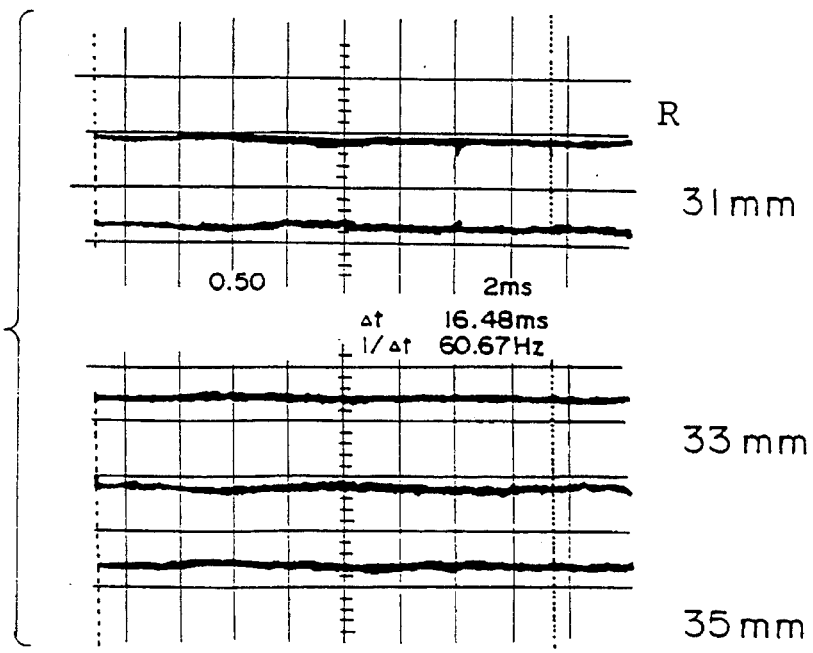
Figure 3:
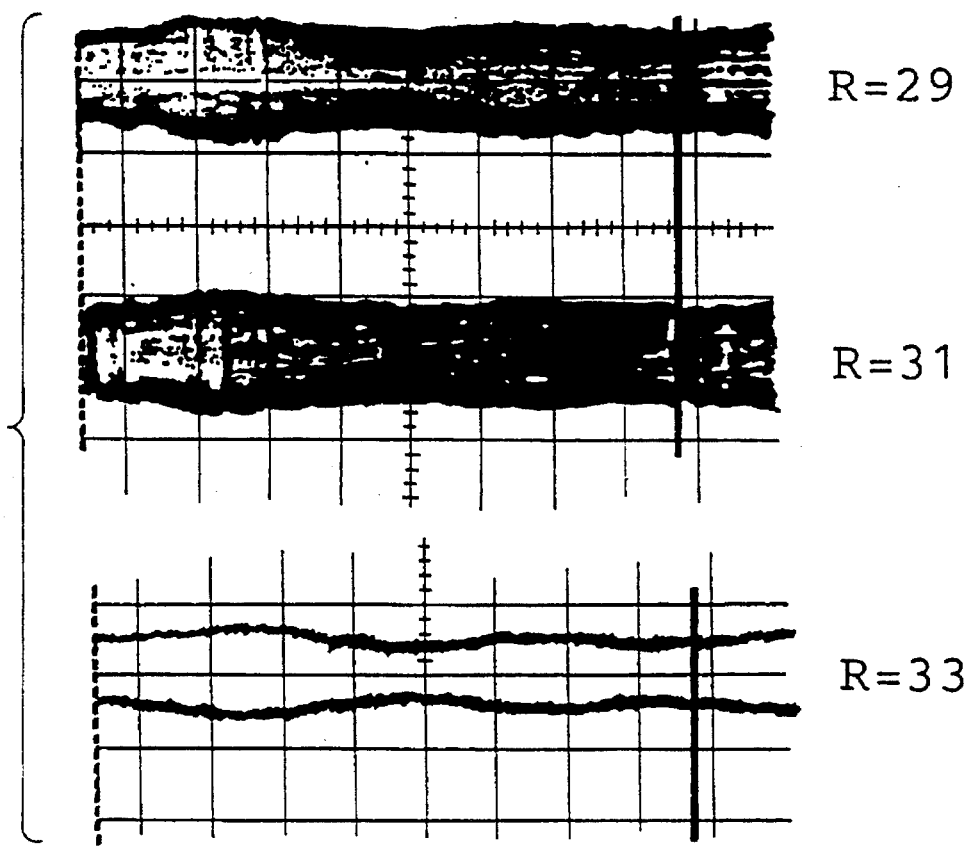

Tests on frequency characteristics through the measurement of the C/N ratio in the frequency range of 1 to 14 MHz and floating stability tests through measurement of the modulation waveform were conducted on the test samples of the magnetic heads for SSR. The results are shown in FIGS. 3 and 4.

In plotting modulation waveforms shown in FIGS. 3(a) to (g), uniform carrier signals recorded on two tracks within a radius range of 31 to 35 mm from the center of the SSR disk at a frequency of 9 MHz were reproduced by electro-magnetic transducer elements provided on the magnetic head slider test samples, and the respective reproduced signals were recorded.

In these figures, floating stability of the magnetic head was evaluated based on uniformity of the envelope in the modulation waveform. As the numerical criteria, the ratio between the maximum and minimum value of the envelope waveforms was to be not less than 0.8. As a result of the modulation tests, the modulation waveforms of the test samples E, F and G, shown in FIGS. 3(e), (f) and (g), respectively, were evaluated to be satisfactory. Of these, the test sample F was most excellent,. The remaining test samples A, B, C and D exhibited considerable fluctuations in the envelope waveform and were evaluated to be inferior in the floating stability.

FIG. 4 is a graph showing C/N ratio characteristics curves in the frequency range of 1 to 14 MHz, as measured for evaluation of acceptability of frequency characteristics of the test samples A to F. In plotting the C/N ratio characteristic curves, carrier signals recorded at various frequencies on the SSR disk were reproduced by the magnetic head in the same way as for floating stability tests, and the ratio of the carrier signal to the noise signal in the reproduced signal was expressed in decibels (dB).

In FIG. 4, the value of the C/N ratio not less than at least 40 dB within the entire frequency range of 1 to 14 MHz has been evaluated to be satisfactory, in view of the recent tendency towards increasing the magnetic recording density. This value of the C/N ratio which is as large as possible and constant without frequency dependency is naturally desirable. The above selected frequency range is rather broad in view that the frequency range of 1 to 7 MHz is thought to be sufficient for, for example, a hard disk device.

In the C/N ratio test, the test samples A, B, D, E and F were evaluated to be satisfactory, whereas the test samples C and G were evaluated to be inferior in a higher frequency range.

In the above two tests, the test sample F was evaluated to be satisfactory in both floating stability and frequency characteristics.

(3) Confirmation of Groove Width

As discussed hereinabove, a slider having a radius R of the spherical facing surface of 80 mm and, as the sizes of the facing surface, a transverse width W and a length L of the facing surface of 2 mm and 3 mm, respectively, a width of each longitudinal groove formed on the facing surface of 230 µm and the number of the longitudinal grooves of two, were found to be satisfactory in view of superior characteristics. The desirable range of the groove width is to be determined in the following manner.

A test sample $F_1$ with a groove width of 100 µm and a test sample $F_2$ with a groove width of 350 µm, with the radii and the sizes of the facing surfaces of the samples $F_1$ and $F_2$ being as defined above and with the number of the groove thereof being two, were further produced, and tested for floating stability and frequency characteristics, by way of comparison with each other and with the previously obtained test sample F.

It has been found that the previously obtained test sample F with the transverse width of 230 µm, ranks first in floating stability, followed by the test sample $F_2$ with the groove width of 350 µm and the test sample $F_1$ with the groove width of 100 µm, in this order.

The test sample $F_1$ was on the acceptance side of a borderline for acceptability evaluation, and hence was evaluated to be acceptable. From an inference based on the groove widths of 230 µm and 350 µm, the tapper limit of acceptability of the groove width was determined to be 500 µm.

Based on the results of the above tests, the following floating head slider satisfying the following conditions has been found to posses satisfactory characteristics and be in meeting with the object of the present invention.

(a) The radius of the spherical facing surface of the slider R is within a range of 80 mm ≦ R ≦ 100 mm.

If the radius of the spherical surface R is larger than 100 mm, the amount of float of the slider is so large that the pressing load applied from an arm supporting the slider also needs to be increased to impair floating stability. On the other hand, if the radius R is less than 80 mm, the amount of float is so small that the SSR disk film and the facing surface of the slider collide against each other vigorously to cause vibrations upon a least amount of swing, disadvantageously to produce considerable fluctuations in the reproduced signals and an excess wear to the film surface.

(b) The facing surface of the slider has a size defined by the transverse width of 2 mm or less and an overall length of 3 mm or less.

If the transverse width exceeds 3 mm or the overall length exceeds 4 mm, floating stability is impaired to produce severe fluctuations in the reproduced signals. Response properties desired for high density recording also are lowered. The smaller the size of the facing surface of the slider, the smaller the amount of float of the magnetic head and the more satisfactory the frequency characteristics.

Meanwhile, if two longitudinal grooves close to 500 µm in transverse width are to be formed, it is necessary that the transverse width W be 1 mm or more. The track width of approximately 6 µm and the machining tolerance summed together are not more than approximately 30 µm, which value is negligibly small as compared to the lower limit of 1 mm of the transverse width.

The lower limit of the overall length is determined in view of both the lower limit value of the thickness of the substrate of the device and running stability of the magnetic head. Although it is technically feasible to reduce the size of the substrate to an order of about 0.3 mm, the substrate thickness of at least 1 mm is desirable for procuring substrate strength necessary for production. From the aspect of running stability of the magnetic head, the ratio of transverse width to overall length of 0.75 to 0.78 is preferred, so that, for the transverse width of 1 mm, the overall length of approximately 1.3 mm is preferred. Based on the foregoing, the lower limit of the overall length is set to approximately 1 mm.

(c) Insofar as the longitudinal grooves formed in the facing surface are concerned, the groove width w is set so that 100 µm≦w≦500 µm, and the number of grooves is two or more.

The groove width is in the range from 20 to 150 µm. With the groove width w larger than 500 µm, the amount of float falls short, so that floating stability is inferior and thus fluctuations are produced in the reproduced signals. With the groove width w less than 100 µm, the frequency characteristics becomes inferior. Thus these ranges are to be excluded from the scope of the present invention.

Although two or more grooves are required, if the product of the groove width and the number of the grooves exceeds 1000 µm, a sufficient force necessary for floating cannot be produced under the conditions that the radius of the spherical facing surface R is such that 80 mm≦R≦100 mm and the size of the facing surface is defined by the transverse width of 2 mm or less and the overall length of 3 mm or less.

On the other hand, if the groove is formed at the center of the slider, an electro-magnetic transducer element cannot be provided at an apex of the spherical surface which is closest to the SSR disk. In the complete absence of the groove, desired properties cannot be produced due to vibrations, such as rolling, of the slider.

With the magnetic head for SSR according to the present invention, having the above defined construction, the ratio between the maximum and the minimum values of the modulation waveform as an index of floating stability has a desirable value of 0.8 or higher, while the C/N ratio curve as an index of frequency characteristics has a desirable value of 40 dB or higher for the frequency range of 1 to 14 MHz. As a result, floating stability and frequency characteristics are both satisfactory.

EXAMPLES

Figure 1:
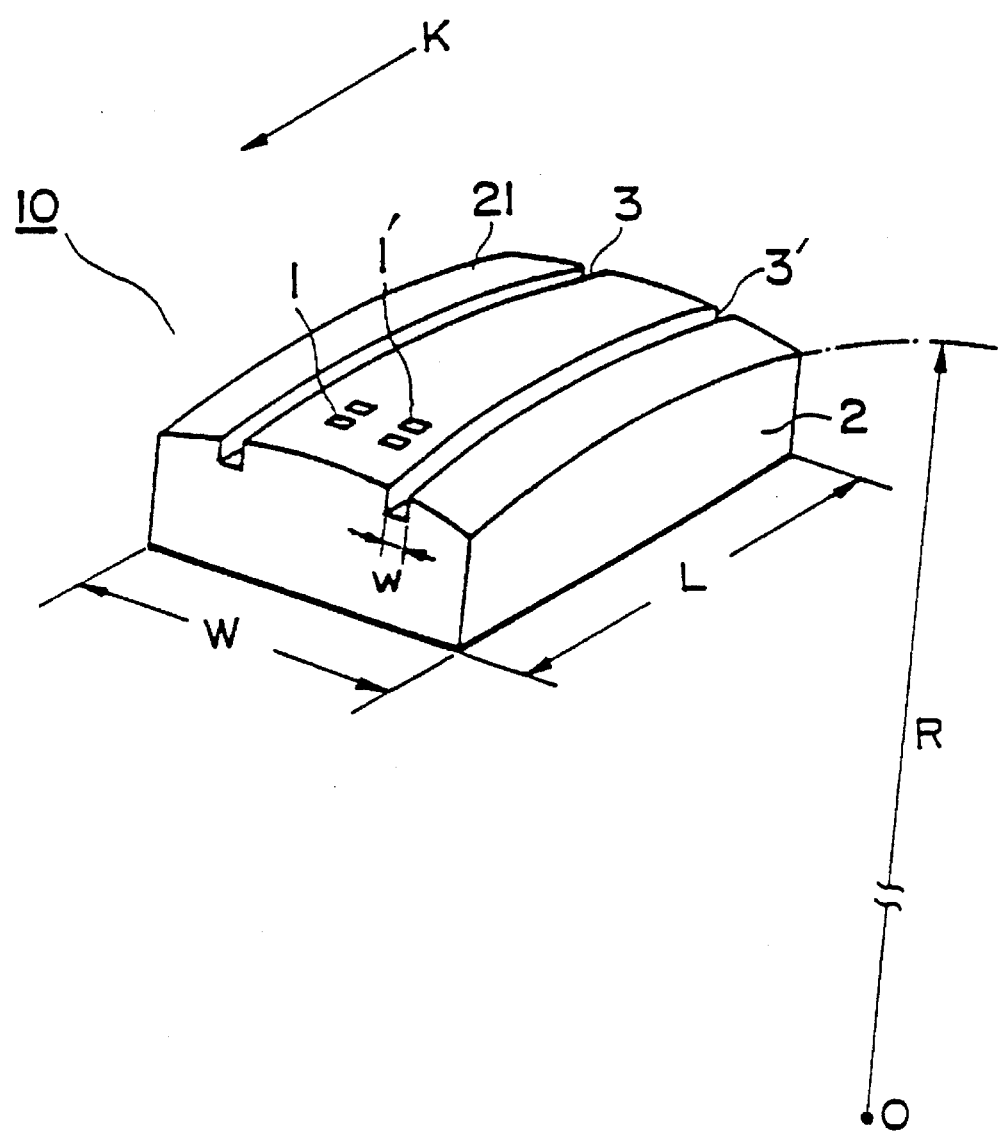
FIG. 1 is a perspective view showing a magnetic head for SSR embodying the present invention.

A magnetic head embodying the present invention is explained by referring to FIG. 1. The magnetic head, indicated by a reference numeral 10, has a floating head slider 2, which has a facing surface 21 of the slider facing an SSR disk, not shown, formed as a part of a spherical surface having a radius g equal to 80 mm. The size of the facing surface 21 is defined by a transverse width W in a direction normal to an air flow direction K, shown by an arrow, equal to 2 mm, and an overall length L along the air flow direction K, equal to 3 mm. In the vicinity of an air effluent end of the facing surface 21 of the slider 2, a pair of electro-magnetic transducer elements 1, 1' are disposed along the transverse direction. However, only one electro-magnetic transducer element suffices.

On both outer lateral sides of the transducer elements 1, 1' on the facing surface 21 of the slider 2, a pair of longitudinal grooves 3, 3' are arranged in the air flow direction K, with the groove width w being 230 µm and the groove depth at the deepest central region being 50 µm. The groove bottom is adapted to run parallel to an SSR disk film when the slider is placed facing the disk film. Alternatively, the groove bottom may be inclined so that the groove depth is larger at the air effluent side than at the air inlet side, or vice versa.

Figure 2:
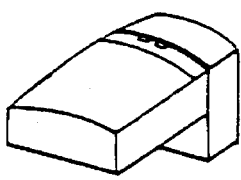
FIG. 2(a) to (g) are schematic perspective view showing samples for testing A to G according to the present invention.
Figure 2:
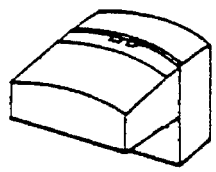
Figure 2:
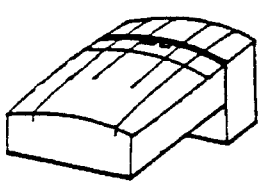
Figure 2:
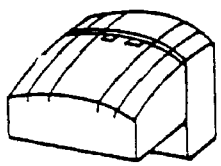
Figure 2:
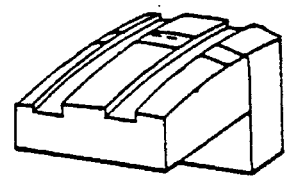
Figure 2:
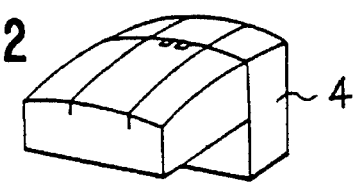
Figure 2:
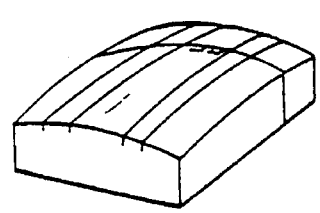

In producing a thin film magnetic head for SSR of the present embodiment, the thin film head device formed on a wafer is cut by machining to a predetermined size. A protective plate 4 or the like (as shown in FIG. 2) is affixed, e.g., by glass fusion, to the head device so as to form a continuous extension of the spherical surface. The facing surface is ground to a mirror finish state. The magnetic head, produced in this manner, floats by an air flow flowing into the space between the SSR disk and the facing surface.

It should be noted that modifications may be done in the art without departing from the gist and scope of the present invention as disclosed herein and claimed in the accompanying claims.

What is claimed is:

1. A thin film magnetic head comprising a floating head slider having a spherical surface, a portion of which constitutes a medium facing surface, wherein a radius R of said spherical surface is in a range of 80 mm≦R≦100 mm, said facing surface, as viewed from a magnetic recording medium opposing said facing surface, is in the shape of a rectangle having an overall length L along the air flow of 1.3 to 3 mm and a transverse width W in a direction normal to the air flow of 1 to 2.2 mm, and wherein at least two longitudinal grooves, each having a width w in a range of 100 µm≦w≦500 µm, are formed on said facing surface extending along said air flow, wherein the grooves have a depth of 20 to 150 µm, wherein at least one transducer element is disposed in the spherical surface at the effluent side of air flow, and wherein said head has an improved modulation waveform indexed by a relative index value of at least 0.8.

2. The thin film magnetic head according to claim 1, wherein said transverse width W is 2 mm or less.

3. The thin film magnetic head according to claim 1, wherein the radius of curvature R is 80 mm.

4. The thin film magnetic head according to claim 1, wherein the width W of the groove is 200 to 300 µm.

5. The thin film magnetic head according to claim 1, wherein the radius of curvature R is 80 mm, the transverse width W is 2 mm, the overall length L is 3 mm, the width w of each of the grooves is 200 to 300 µm, the grooves have a depth of 50 µm at the central region, and the grooves have a bottom surface adapted to extend substantially parallel to a recording medium.

6. The thin film magnetic head according to claim 1, wherein the grooves number more than 2.

7. The thin film magnetic head according to claim 6, wherein said at least one transducer element is disposed in the spherical surface at a distance of at least 1 mm from an in-flowing end of the air flow.

8. The thin film magnetic head according to claim 1, wherein the transverse width W is less than or equal to 2 mm but greater than or equal to 1 mm and is in a ratio to the overall length L at 0.75 to 0.78, and wherein the radius of curvature R is 80 mm.

9. The thin film magnetic head according to claim 1, wherein two transducer elements are disposed along the transverse direction at the effluent side of air flow.

10. The thin film magnetic head according to claim 1, wherein said at least one transducer element is disposed in the spherical surface at a distance of at least 1 mm from an in-flowing end of the air flow.

* * * * *